No. 793,705. PATENTED JULY 4, 1905.
R. P. WINSOR.
LAWN EDGE TRIMMER.
APPLICATION FILED APR. 1, 1904.
2 SHEETS—SHEET 1.
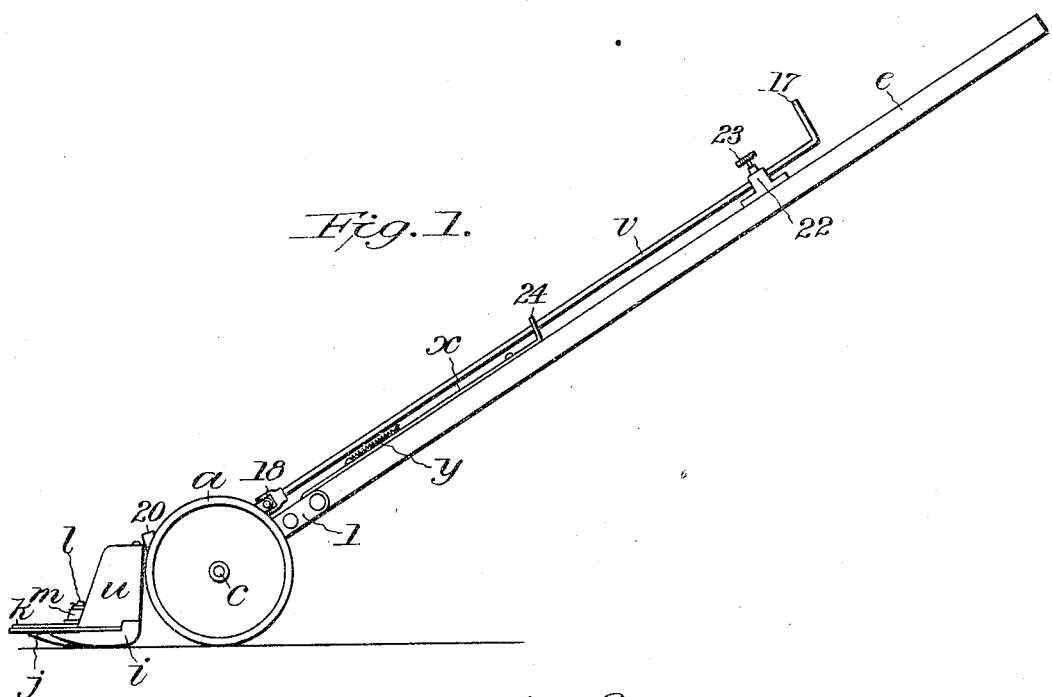
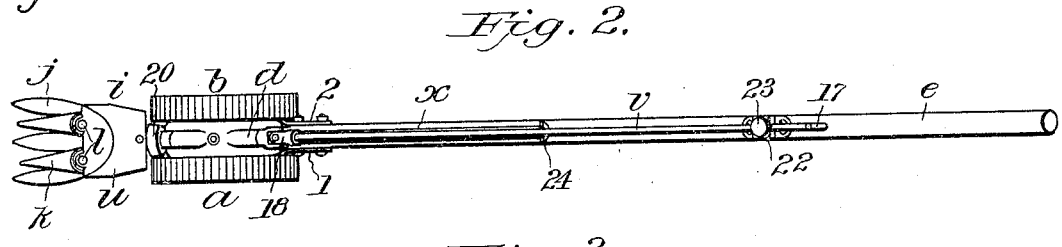
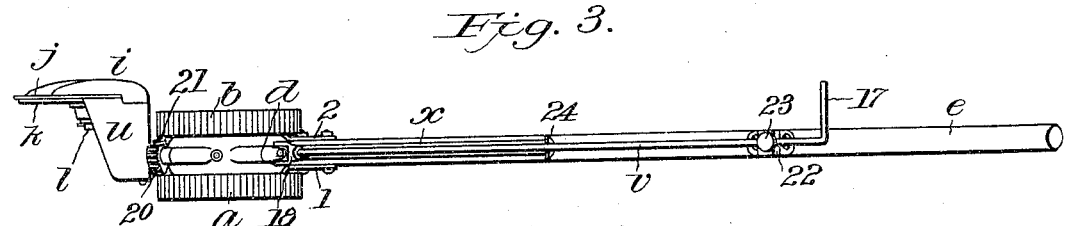
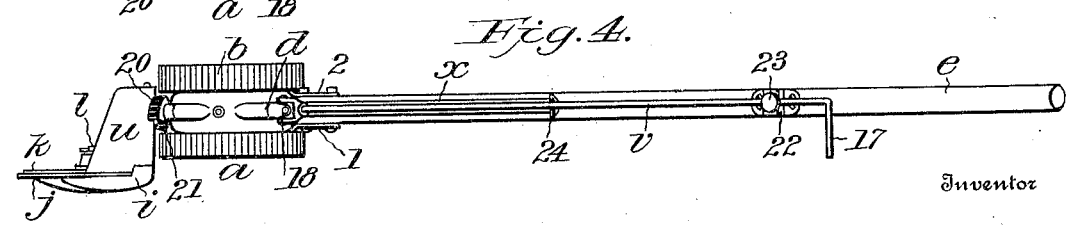
Witnesses
C. H. Walker.
E. Thos. Loftus
Inventor
Robert P. Winsor
Attorney No. 793,705. PATENTED JULY 4, 1905.
R. P. WINSOR.
LAWN EDGE TRIMMER.
APPLICATION FILED APR. 1, 1904.
2 SHEETS—SHEET 2.
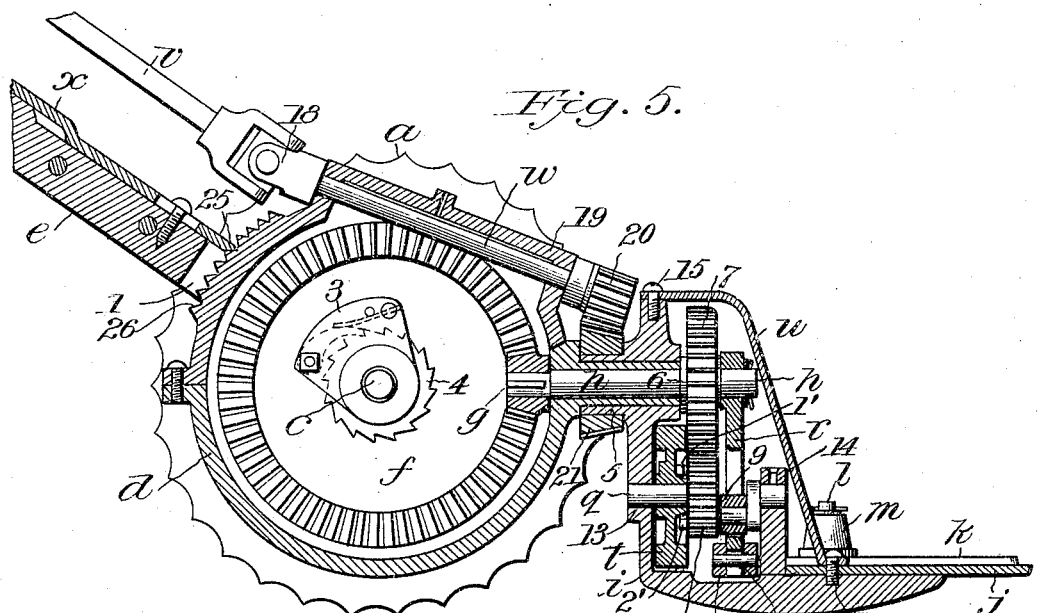
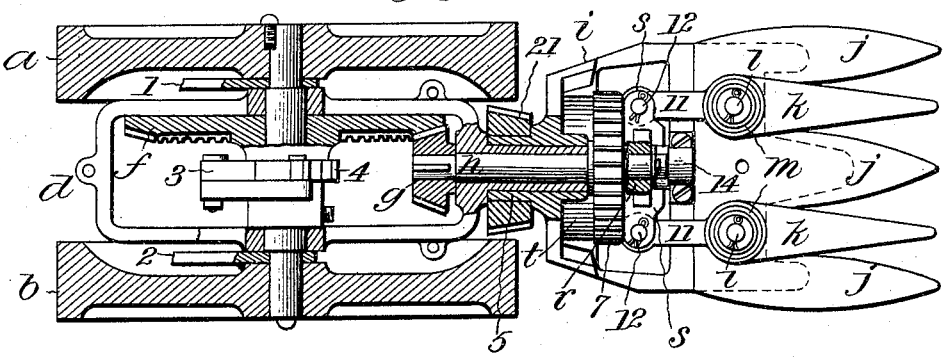
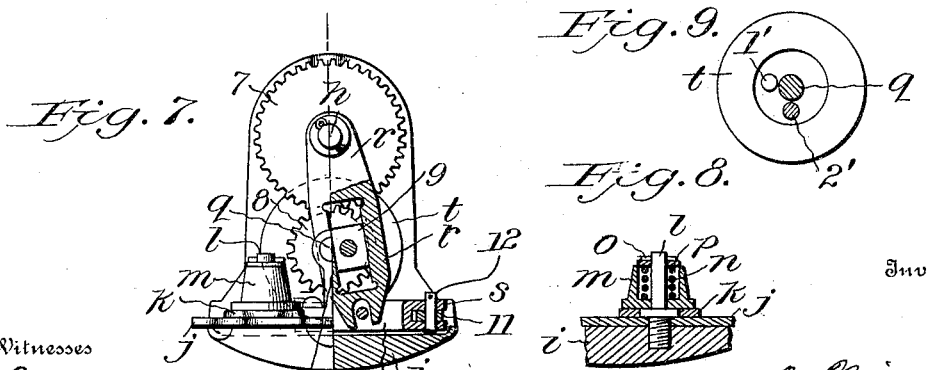
Witnesses
C. N. Walker
E. Thos. Loftus
Inventor
Robert P. Winsor
per R. P. Ervin, Attorney.

No. 793,705. Patented July 4, 1905.

UNITED STATES PATENT OFFICE.

ROBERT P. WINSOR, OF PROVIDENCE, RHODE ISLAND.

LAWN-EDGE TRIMMER.

SPECIFICATION forming part of Letters Patent No. 793,705, dated July 4, 1905.

Application filed April 1, 1904. Serial No. 201,148.

*To all whom it may concern:*

Be it known that I, ROBERT P. WINSOR, a citizen of the United States of America, and a resident of Providence, in the State of Rhode Island, have invented a new and useful Improvement in Lawn-Edge Trimmers, of which the following is a specification.

This invention relates to lawn-edge trimmers having wheel-operated cutters; and it consists in certain novel combinations of parts hereinafter set forth and claimed.

The general object of the present invention is to provide a thoroughly practical and reasonably simple and inexpensive machine adapted to trim the strip of grass about three inches wide that is left around the house or the like, as well as to trim the edges of walks and flower-beds that cannot be cut by ordinary lawn-mowers and are still commonly trimmed by means of hand-shears.

The specific objects of the several combinations of parts in the improved machine include the following: to facilitate changing the knives at will from a horizontal position to a vertical or angular position at either side of the trimmer, or vice versa, to render the cutter and its appurtenances equally well supported and equally well driven in all its positions, and to apply the power to the knife or knives in such a way as to avoid any cramping action.

Another object is to provide by a self-acting device for starting the knives when they have been stopped by some small clogging obstruction.

Two sheets of drawings accompany this specification as part thereof.

Figure 1 of the drawings is a side view of the improved lawn-edge trimmer with the knives horizontal. Fig. 2 is a plan view projected from Fig. 1. Figs. 3 and 4 are plan views showing the knives in vertical position at opposite sides of the machine. Fig. 5 is a sectional side view of the knife end of the machine, on a larger scale. Fig. 6 is a sectional plan view, the plane of section being horizontal and coincident with the axle of the machine. Fig. 7 is a fragmentary front view of the knives and their improved appurtenances with the front housing removed and one half in section. Fig. 8 represents a vertical section through the pivot of one of the knives, and Fig. 9 is a sectional detail of the fly-wheel of the cutter mechanism.

Like reference letters and numbers refer to like parts in all the figures.

The improved lawn-edge trimmer is adapted and designed to be of the simple and compact shape indicated by Figs. 1 to 4, inclusive, and comprises a pair of ground-wheels $a$ and $b$ at its sides, a rotary axle $c$, common to said wheels, a mechanism-housing $d$, carried between said wheels, a pushing-handle $e$, having connections 1 and 2 with said axle at the sides of said housing, and mechanism within said housing (exposed to view in Figs. 5 and 6) for transmitting rotary motion from said wheels and axle. Said mechanism comprises a beveled gear $f$, loose on the axle $c$ and connected therewith when the machine is pushed forward by a pawl-carrying attachment 3, carried by said axle, and a ratchet-wheel 4, formed or fastened on the hub of said beveled gear. Its other element is a beveled pinion $g$, in constant mesh with said beveled gear $f$ at the front of the housing. A forwardly-projecting longitudinal shaft $h$, on the rear end of which said pinion $g$ is fast, is driven by said mechanism. A cutter-supporting head $i$, carried in front of said housing $d$, is constructed with a rearwardly-projecting cylindrical neck 5 in the horizontal plane of the axle $c$, having a bore concentric therewith through which said shaft $h$ extends, the lengthwise displacement of said shaft and said neck being prevented by a collar 6, fast on said shaft near its front end, and the hub of said pinion $g$, fast on its rear end within said housing $d$. A normally low-down and horizontally-disposed cutter carried by the head $i$ is composed of a finger-bar $j$, of plate-steel, attached to the flat-topped bottom of said head, and superposed laterally-swinging knives $k$. Flanged screw-studs $l$, one of which is shown in the plane of section in Fig. 8, fasten the finger-bar $j$ in place and form the pivots of the knives $k$. Cup-shaped caps $m$, each inclosing a short spiral spring $n$, Fig. 8, held in place by a cotter-pin $o$ and washer $p$, Fig. 8, exclude dust from the pivotal bearings of the knives $k$ and press their cutting edges against those of the finger-bar *j*. Motion is transmitted downward from the longitudinal shaft *h* to the knives *k* in such a way as to avoid cramping action as follows, (see Figs. 5, 6, and 7:) Immediately in front of its collar 6 said shaft *h* carries a spur-wheel 7, that is meshed by a subjacent pinion 8 on a crank-shaft *q*, parallel with said shaft *h*. Projecting beyond said spur-wheel 7 the front end of said shaft *h* forms a fulcrum for a swinging lever *r*, provided with a sliding brass 9 to embrace the wrist of the crank-shaft. Beneath the crank-shaft the swinging lever is loosely pivoted within an open-topped recess 10 in a horizontal connecting-bar *s*, that is loosely pivoted to rearwardly-extending rigid arms 11, Figs. 6 and 7, of the knives *k* by vertical pivots 12. A fly-wheel *t* is mounted loosely on the crank-shaft *q* behind the pinion 8 and connected with said pinion 8 by pins 1′ and 2′, Fig. 9, on the respective parts. Should some obstruction clog the knives, the crank-shaft *q* and pinion 8 would stop very suddenly; but the fly-wheel *t*, being loose on the shaft, would continue to revolve for almost one revolution, when the pin 1′ on the fly-wheel would strike the pin 2′ on the pinion, and the momentum stored in the fly-wheel would have a tendency to start the crank-shaft *q*, and therewith the knives *k*, in operation again by an effectively-directed impulse similar to a little hammer-blow. The rear end of the crank-shaft has a bearing 13, Fig. 5, in the back of the head *i*, and its front end is supported by a pillow-block 14. A dust-tight housing *u*, conveniently formed in one part and attached by two screws 15 and 16, Fig. 5, incloses the whole of said mechanism carried by the head *i* behind the knife-pivots *l*, as shown in Figs. 1 to 5, inclusive. For turning the head *i* around the central longitudinal axis formed by said neck 5 into either of the positions in which it is shown in Figs. 1 and 2, Fig. 3, and Fig. 4 or intermediate angular positions as required for conveniently trimming the edges of walks, flower-beds, &c., a rock-shaft *v* extends lengthwise of the handle *e* and is provided with a lever-arm 17 convenient to the hand of the operator, and with a knuckle-joint 18 adjacent to the main housing *d*. From said joint 18 and connected thereby to said rock-shaft *v* a short rock-shaft *w* extends forwardly within a bearing 19 at the top of said housing *d* and carries at its front end a toothed sector 20 in mesh with a toothed wheel 21, fast on said neck 5 of the head *i*. A bearing 22 for said rock-shaft *v* is attached to the handle *e*, as shown in Figs. 1 to 4, and provided with a set-screw 23, by which to fasten the rock-shaft *v*, and therewith the head *i* and the cutter *j k*, in their different angular positions.

For raising and lowering the handle *e* with reference to the cutter *j k* in the horizontal position of the latter, Figs. 1 and 2, a flat bolt *x*, having a finger-flange 24 at its upper end, is attached to the top of the handle, so as to be longitudinally movable, and is further connected therewith by a tensile spring *y*, Fig. 1, that keeps the lower end of the bolt normally projected. This end of said bolt *x* (shown at 25 in Fig. 5) is adapted to engage with a segmental series of notches 26, preferably V-shaped, extending circumferentially on the main housing *h*. By retracting the bolt *x* or with the V-shaped notches by applying sufficient force the handle *e* may be adjusted as to angle, so as to be convenient to the operator, and may be dropped to the floor when the machine is out of use. Different means for so adjusting the handle *e* may be employed in connection with the respective combinations hereinafter claimed, or such means may be omitted. Other mechanical details not essential to the respective combinations may be varied at will, and other like modifications will suggest themselves to those skilled in the art.

Having thus described said improvement, I claim as my invention and desire to patent under this specification—

1. A lawn-edge trimmer having, in combination, a pair of ground-wheels at its sides, an axle common to both, a housing nearly filling the space between said wheels and supported by said axle, a pushing-handle connected with said axle at the sides of said housing, mechanism within said housing for transmitting rotary motion from said wheels, a longitudinal shaft driven by said mechanism, a cutter-supporting head carried in front of said housing, a normally low-down and horizontally-disposed cutter carried by said head, and mechanism transmitting motion from said longitudinal shaft to said cutter.

2. A lawn-edge trimmer having, in combination, a pair of ground-wheels at its sides, an axle common to both, a housing nearly filling the space between said wheels and supported by said axle, a pushing-handle connected with said axle at the sides of said housing, mechanism within said housing for transmitting rotary motion from said wheels, a longitudinal shaft in the horizontal plane of said axle driven by said mechanism, a cutter-supporting head carried immediately in front of said housing, a normally low-down and horizontally-disposed cutter carried by said head, mechanism transmitting motion downwardly from said longitudinal shaft to said cutter, and a housing for the mechanism last named carried by said head.

3. A lawn-edge trimmer having, in combination, a pair of ground-wheels at its sides, a rotary axle common to both, a housing nearly filling the space between said wheels and supported by said axle, a pushing-handle connected with said axle at the sides of said housing, mechanism within said housing for transmitting rotary motion from said axle, a central longitudinal shaft in the plane of said axle driven by said mechanism, a cutter-supporting head carried immediately in front of said housing, a normally low-down and horizontally-disposed cutter carried by said head, and mechanism transmitting motion downwardly from said longitudinal shaft to said cutter.

4. A lawn-edge trimmer having, in combination, a pair of ground-wheels at its sides, an axle common to both, a housing carried between said wheels, a central pushing-handle connected with and movable around said axle, means including a longitudinal slide carried by said handle and a rack concentric with said axle formed on said housing for rigidly connecting these parts at different angles, mechanism within said housing for transmitting rotary motion from said wheels, a longitudinal shaft driven by said mechanism, a cutter-supporting head carried in front of said housing, a normally low-down and horizontally-disposed cutter carried by said head, and mechanism transmitting motion from said longitudinal shaft to said cutter.

5. A lawn-edge trimmer having, in combination, a pair of ground-wheels at its sides, an axle common to both, a housing carried between said wheels, a central pushing-handle connected with and movable around said axle, means including a spring-projected longitudinal slide carried by said handle and a rack concentric with said axle formed on said housing and having V-shaped notches for rigidly connecting these parts at different angles, mechanism within said housing for transmitting rotary motion from said wheels, a longitudinal shaft driven by said mechanism, a cutter-supporting head carried in front of said housing, a normally low-down and horizontally-disposed cutter carried by said head, and mechanism transmitting motion from said longitudinal shaft to said cutter.

6. A lawn-edge trimmer having, in combination, a pair of ground-wheels at its sides, a housing carried between said wheels, a pushing-handle, mechanism within said housing for transmitting rotary motion from said wheels, a longitudinal shaft driven by said mechanism, a cutter-supporting head carried in front of said housing, and movable around a central longitudinal axis, a normally low-down and horizontally-disposed cutter carried by said head, means for turning said head on said axis to render the cutter inclined or vertical at either side of the trimmer, and mechanism transmitting motion from said longitudinal shaft to said cutter.

7. A lawn-edge trimmer having, in combination, a pair of ground-wheels at its sides, a housing carried between said wheels, a pushing-handle, mechanism within said housing for transmitting rotary motion from said wheels, a longitudinal shaft driven by said mechanism, a cutter-supporting head carried in front of said housing, and movable around a central longitudinal axis, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator, and mechanism transmitting motion from said longitudinal shaft to said cutter.

8. A lawn-edge trimmer having, in combination, a pair of ground-wheels at its sides, a housing carried between said wheels, a central pushing-handle, mechanism within said housing for transmitting rotary motion from said wheels, a longitudinal shaft driven by said mechanism, a cutter-supporting head carried in front of said housing, and movable around a central longitudinal axis, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator, and a short rock-shaft having bearings in said housing at top and connected with the rock-shaft first named by a knuckle-joint, and mechanism transmitting motion from said longitudinal shaft to said cutter.

9. A lawn-edge trimmer having, in combination, a pair of ground-wheels at its sides, a housing carried between said wheels, a central pushing-handle, mechanism within said housing for transmitting rotary motion from said wheels, a longitudinal shaft driven by said mechanism, a cutter-supporting head carried in front of said housing, and movable around a central longitudinal axis, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator, a short rock-shaft having bearings in said housing at top and connected with the rock-shaft first named by a knuckle-joint, a toothed sector fast on said short rock-shaft and a toothed wheel fast on said head concentric with said axis, and mechanism transmitting motion from said longitudinal shaft to said cutter.

10. A lawn-edge trimmer having, in combination, a pair of ground-wheels at its sides, a housing carried between said wheels, a pushing-handle, mechanism within said housing for transmitting rotary motion from said wheels, a longitudinal shaft driven by said mechanism, a cutter-supporting head carried in front of said housing, and movable around a central longitudinal axis, a normally low-down and horizontally-disposed cutter carried by said head, means for turning said head on said axis to render the cutter inclined or vertical at either side of the trimmer, means for fastening said head in its different angular positions, and mechanism transmitting motion from said longitudinal shaft to said cutter.

11. A lawn-edge trimmer having, in combination, a pair of ground-wheels at its sides, a housing carried between said wheels, a central pushing-handle, mechanism within said housing for transmitting rotary motion from said wheels, a central longitudinal shaft driven by said mechanism, a cutter-supporting head carried in front of said housing and movable around the axis of said shaft, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator, and mechanism transmitting motion from said longitudinal shaft to said cutter.

12. A lawn-edge trimmer having, in combination, a pair of ground-wheels at its sides, a housing carried between said wheels, a central pushing-handle, mechanism within said housing for transmitting rotary motion from said wheels, a central longitudinal shaft driven by said mechanism, a cutter-supporting head carried in front of said housing and movable around the axis of said shaft, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator and a short rock-shaft having bearings in said housing at top and connected with the rock-shaft first named by a knuckle-joint, and mechanism transmitting motion from said longitudinal shaft to said cutter.

13. A lawn-edge trimmer having, in combination, a pair of ground-wheels at its sides, a housing carried between said wheels, a central pushing-handle, mechanism within said housing for transmitting rotary motion from said wheels, a central longitudinal shaft driven by said mechanism, a cutter-supporting head carried in front of said housing and movable around the axis of said shaft, a normally low-down and horizontally-disposed cutter carried by said head, means for turning said head on said axis to render the cutter inclined or vertical at either side of the trimmer, such means including a rock-shaft extending lengthwise of said handle and having a lever-arm convenient to the hand of the operator, a short rock-shaft having bearings in said housing at top and connected with the rock-shaft first named by a knuckle-joint, a toothed sector fast on said short rock-shaft and a toothed wheel fast on said head concentric with said axis, and mechanism transmitting motion from said longitudinal shaft to said cutter.

14. In a lawn-edge trimmer, the combination of a ground-wheel axle, a housing supported by said axle, mechanism within said housing for transmitting rotary motion, a longitudinal shaft in the plane of said axle driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft and a vertically-disposed swinging lever oscillated by said crank-shaft.

15. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft, and a swinging lever having its fulcrum coincident with the axis of the upper shaft and oscillated by said crank-shaft.

16. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft, and a vertically-disposed swinging lever oscillated by said crank-shaft and having a loose connection with a subjacent member of the cutter.

17. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft, and a swinging lever having its fulcrum coincident with the axis of the upper shaft oscillated by said crank-shaft and having a loose connection with a subjacent member of the cutter.

18. In a lawn-edge trimmer, the combination of a housing, mechanism within said housing for transmitting rotary motion, a longitudinal shaft driven by said mechanism, a cutter-supporting head carried in front of said housing having normally low-down and horizontally-disposed fingers, knives movable in the plane of said fingers and coöperating therewith, and mechanism transmitting motion downwardly to said knives comprising a subjacent crank-shaft having its bearings in said head, gearing connecting said shaft and crank-shaft, and a swinging lever having its fulcrum coincident with the axis of the upper shaft oscillated by said crank-shaft and having a loose connection with a subjacent member of the cutter.

19. A lawn-edge trimmer having, in combination, a housing, mechanism within said housing for transmitting rotary motion, a longitudinal shaft driven by said mechanism, a cutter-supporting head carried in front of said housing having normally low-down and horizontally-disposed fingers, oscillating knives movable in the plane of said fingers and coöperating therewith, and mechanism transmitting motion downwardly to said knives comprising a subjacent crank-shaft having its bearings in said head, gearing connecting said shaft and crank-shaft, a swinging lever oscillated by said crank-shaft, and a connecting-bar having a loose pivotal connection with said lever and pivoted to the respective knives by vertical pivots, substantially as hereinbefore specified.

20. A lawn-edge trimmer having, in combination, a housing, mechanism within said housing for transmitting rotary motion, a longitudinal shaft driven by said mechanism, a cutter-supporting head carried in front of said housing and movable around said shaft, having normally low-down and horizontally-disposed fingers, oscillating knives movable in the plane of said fingers and coöperating therewith, and mechanism transmitting motion downwardly to said knives comprising a subjacent crank-shaft having its bearings in said head, gearing connecting said shaft and crank-shaft, a swinging lever oscillated by said crank-shaft, and a connecting-bar having a loose pivotal connection with said lever and pivoted to the respective knives by vertical pivots, substantially as hereinbefore specified.

21. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, a lost-motion fly-wheel on said crank-shaft and means for positively limiting such lost motion.

22. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft including a pinion on the latter provided with a stud-pin parallel to the shaft and a lost-motion fly-wheel on said crank-shaft provided with a stud-pin arranged to contact with the stud-pin first named.

23. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft having its bearings in said head, gearing connecting said shaft and crank-shaft comprising a pinion on the latter provided with a stud-pin parallel to the shaft, a lost-motion fly-wheel on said crank-shaft having a stud-pin arranged to contact with the stud-pin first named, and a swinging lever oscillated by said crank-shaft.

24. In a lawn-edge trimmer, the combination of a housing, mechanism within said housing for transmitting rotary motion, a longitudinal shaft driven by said mechanism, a cutter-supporting head carried in front of said housing and movable around the axis of said shaft, a normally low-down and horizontally-disposed cutter carried by said head, and mechanism transmitting motion downwardly to said cutter comprising a subjacent crank-shaft, a pinion on the latter provided with a stud-pin parallel to the shaft, a lost-motion fly-wheel on said crank-shaft having a stud-pin arranged to contact with the stud-pin first named and a swinging lever having its fulcrum coincident with the axis of the upper shaft and oscillated by said crank-shaft.

25. A lawn-edge trimmer having, in combination, a housing, mechanism within said housing for transmitting rotary motion, a longitudinal shaft driven by said mechanism, a cutter-supporting head carried in front of said housing having normally low-down and horizontally-disposed fingers, oscillating knives movable in the plane of said fingers and coöperating therewith, and mechanism transmitting motion downwardly to said knives comprising a subjacent crank-shaft having its bearings in said head, gearing connecting said shaft and crank-shaft, a lost-motion fly-wheel on said crank-shaft, a swinging lever oscillated by said crank-shaft, and a connecting-bar having a loose pivotal connection with said lever and pivoted to the respective knives by vertical pivots, substantially as hereinbefore specified.

ROBERT P. WINSOR.

Witnesses:
FRANCIS J. HUGHES,
EDWIN P. LEWIS.